(12) United States Patent
Milne et al.

(10) Patent No.: US 8,291,406 B2
(45) Date of Patent: Oct. 16, 2012

(54) DATA IMAGING SYSTEM AND METHODS

(75) Inventors: Robert T. Milne, Roswell, GA (US); Rocco P. Demasi, Nanuet, NY (US); Ronald L. Bland, Celina, TX (US); Andrew L. Herman, Columbia, MD (US); Arthur A. Tarricone, Jr., Ellicott City, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1087 days.

(21) Appl. No.: 12/015,242

(22) Filed: Jan. 16, 2008

(65) Prior Publication Data

US 2009/0183149 A1   Jul. 16, 2009

(51) Int. Cl.
*G06F 9/44* (2006.01)

(52) U.S. Cl. .............. 717/171; 726/2; 726/26; 726/27; 726/3

(58) Field of Classification Search .......... 717/101–178; 707/694; 709/222–227; 711/162; 370/370–395; 719/328; 726/5
See application file for complete search history.

(56) References Cited

U.S. PATENT DOCUMENTS

| | | | | |
|---|---|---|---|---|
| 5,802,278 | A * | 9/1998 | Isfeld et al. | 709/249 |
| 6,567,860 | B1 * | 5/2003 | Maxwell et al. | 719/327 |
| 6,678,888 | B1 * | 1/2004 | Sakanishi | 717/172 |
| 6,964,034 | B1 * | 11/2005 | Snow | 717/121 |
| 7,024,471 | B2 * | 4/2006 | George et al. | 709/222 |
| 7,458,073 | B1 * | 11/2008 | Darling et al. | 717/168 |
| 7,565,649 | B2 * | 7/2009 | Sasabe | 717/168 |
| 7,644,414 | B2 * | 1/2010 | Smith et al. | 719/328 |
| 7,676,448 | B2 * | 3/2010 | Henderson et al. | 717/171 |
| 7,805,719 | B2 * | 9/2010 | O'Neill | 717/168 |
| 7,913,246 | B2 * | 3/2011 | Hammond et al. | 717/173 |
| 2005/0144186 | A1 * | 6/2005 | Hesselink et al. | 707/101 |
| 2005/0144616 | A1 * | 6/2005 | Hammond et al. | 717/173 |
| 2005/0210459 | A1 * | 9/2005 | Henderson et al. | 717/168 |
| 2006/0130037 | A1 * | 6/2006 | Mackay | 717/168 |
| 2006/0212673 | A1 * | 9/2006 | Fukuguchi et al. | 711/173 |
| 2007/0174351 | A1 * | 7/2007 | Liu et al. | 707/201 |
| 2007/0245409 | A1 * | 10/2007 | Harris et al. | 726/5 |
| 2007/0288710 | A1 * | 12/2007 | Boyd et al. | 711/162 |
| 2007/0300311 | A1 * | 12/2007 | Hirano et al. | 726/33 |
| 2008/0049779 | A1 * | 2/2008 | Hopmann et al. | 370/431 |
| 2008/0056253 | A1 * | 3/2008 | Minami et al. | 370/389 |
| 2009/0125627 | A1 * | 5/2009 | Ford | 709/227 |
| 2009/0125679 | A1 * | 5/2009 | Takeuchi | 711/114 |

* cited by examiner

*Primary Examiner* — Lewis A Bullock, Jr.
*Assistant Examiner* — Francisco Aponte

(57) ABSTRACT

A method performed by a network device may include receiving index information from a second network device identifying an updated application, querying a third network device for the identified updated application, receiving the identified updated application from the third network device, storing the identified updated application received from the third network device and applying stored application user settings from memory to the stored updated application.

18 Claims, 9 Drawing Sheets

DATA IMAGING SYSTEM AND METHODS

BACKGROUND INFORMATION

Commonly, when a new computer is connected to a network, the operating system and software applications (referred to as image data) that may create a user's desktop or workstation must be provided manually from a technician via an image compact disk (CD). In cases where a computer requires updated image data, such as new software application or an upgraded operating system, a technician is required to manually provide user settings to the newly installed applications. In these cases, technicians and network resources are required to provide image data necessary to create the user's desktop environment. Additionally, waiting for technicians to provide the image data and/or user settings results in wasted time by the user of the computer.

BRIEF DESCRIPTION OF THE DRAWINGS

Reference is made to the attached drawings, wherein elements having the same reference number designation may represent like elements throughout.

DETAILED DESCRIPTION OF PREFERRED EMBODIMENTS

The following detailed description refers to the accompanying drawings. The same reference numbers in different drawings identify the same or similar elements. Also, the following detailed description does not limit the systems and methods described herein. Instead, the scope of the systems and methods are defined by the appended claims and equivalents.

Figure 1:
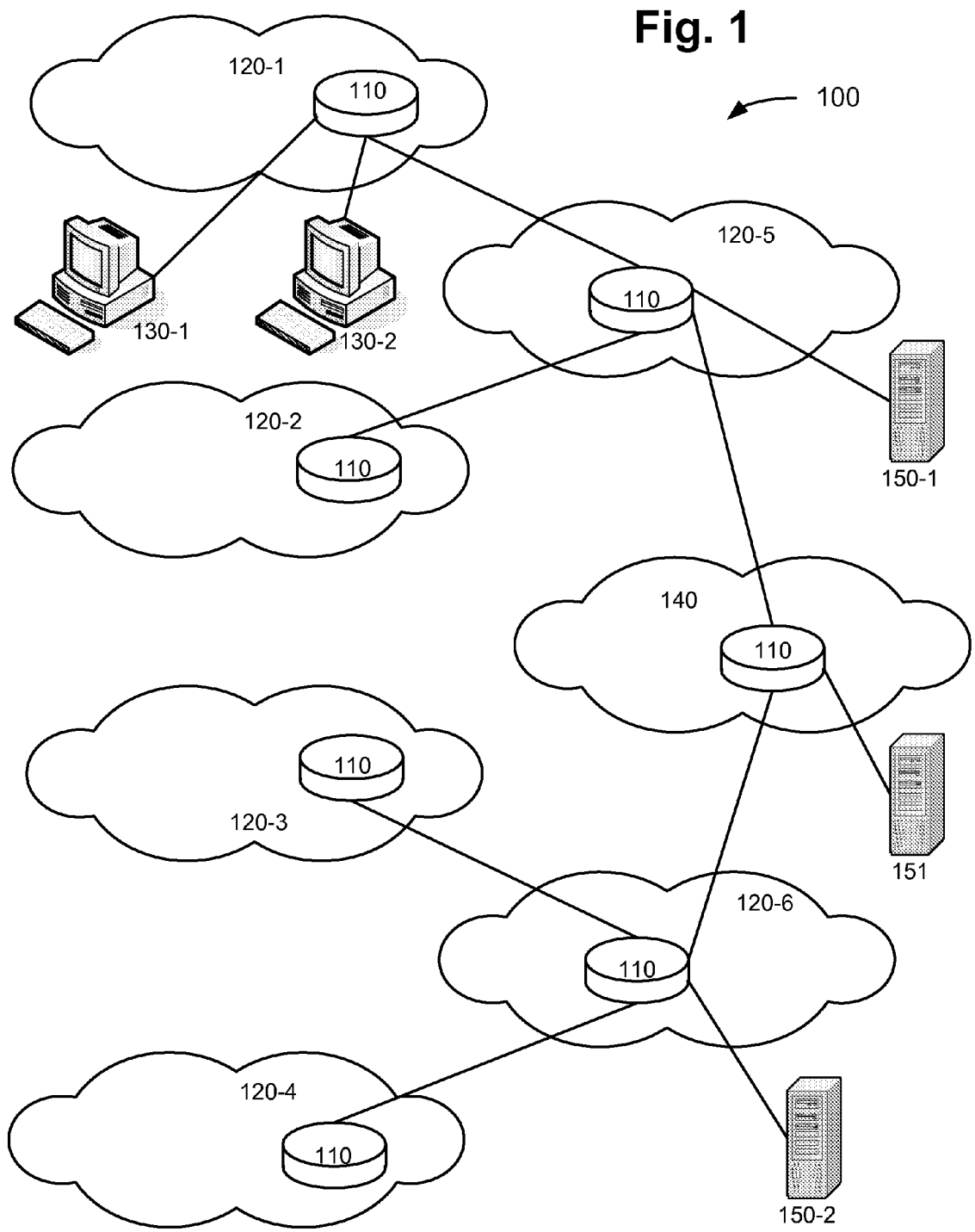
FIG. 1 is a diagram of an exemplary system in which methods and systems described herein may be implemented.

FIG. 1 is a diagram of an exemplary system 100 in which methods and systems described herein may be implemented. System 100 may include routers 110 (hereinafter collectively referred to as routers 110), networks 120-1 to 120-6 (hereinafter collectively referred to as networks 120), computers 130-1 and 130-2 (hereinafter collectively referred to as computers 130), network 140, slave servers 150-1 and 150-2 (hereinafter collectively referred to as slave servers 150) and master server 151. It should be understood that system 100 may include any number of additional devices and/or networks.

Routers 110 may include devices for performing network-related functions. For example, each of routers 110 may include a switch and/or logic for receiving and forwarding data from one network device such as one of computers 130, slave servers 150 and master server 151 to another network device.

Networks 120 may include one or more networks or sub-networks including an Internet Protocol (IP) network, a telephone network, such as the Public Switched Telephone Network (PSTN), or a metropolitan area network (MAN). Network 120 may also include a modem or an Ethernet interface, for example. Routers 110, computers 130, slave servers 150 and master server 151 may communicate over network 120 using, for example IP Protocols. Network 120 may also include devices such as switches, routers, firewalls, gateways, and/or servers (not shown) in order to transmit/receive and route data to/from the connected network devices. Networks 120 may be a hardwired network using wired conductors and/or optical fibers and/or may be a wireless network using free-space optical and/or radio frequency (RF) transmission paths. Implementations of network 120 and/or devices operating in network 120 described herein are not limited to any particular data type, and/or protocol.

Computers 130 may include one or more processors or microprocessors enabled by software programs to perform functions, such as data storage and transmission, and interface with networks 120 and 140, other computers 130, slave servers 150 and master server 151, for example. Computers 130 may include software to enable communications over networks 120 and 140 and/or other networks, such as the Internet. Computers 130 may also include a data storage memory, such as a random access memory (RAM) or another dynamic storage device that stores information. Computers 130 may also include one or more input devices, such as a keyboard for entering data, a mouse for selecting data or pointing to data, and one or more output devices, such as display or monitor for outputting information to a user.

Network 140 may include one or more networks including an IP network, a telephone network, such as the Public Switched Telephone Network (PSTN), or a metropolitan area network (MAN). Network 140 may also include a modem or an Ethernet interface, for example. Routers 110, computers 130 slave servers 150 and master server 151 may communicate over network 140 using, for example IP Protocols. Network 140 may also include devices such as switches, routers, firewalls, and/or gateways (not shown) in order to transmit/receive and route data to/from the connected network devices.

Slave servers 150 may include one or more processors or microprocessors enabled by software programs to perform functions, such as data storage and transmission, and interface with computers 130 and master server 151, for example. Slave server 150 may also include a data storage memory such as a random access memory (RAM) or another dynamic storage device that stores information, as described in detail below. Slave server 150 may also include a communication interface that may include any transceiver-like mechanism that enables slave server 150 to communicate with other devices and/or systems. In addition, slave server 150 may include other mechanisms for communicating data via a network, such as a wireless network, for example.

Master server 151 may include one or more processors or microprocessors enabled by software programs to perform functions, such as data storage and transmission, and interface with other servers and routers 110, for example. Master server 151 may also include a data storage memory, such as a RAM or another dynamic storage device that stores imaging data and information, as described in detail below. Master server 151 may also include a communication interface that may include any transceiver-like mechanism that enables master server 151 to communicate with other devices and/or systems. In addition, master server 151 may include other mechanisms for communicating data via a network, such as a wireless network, for example.

Figure 2:
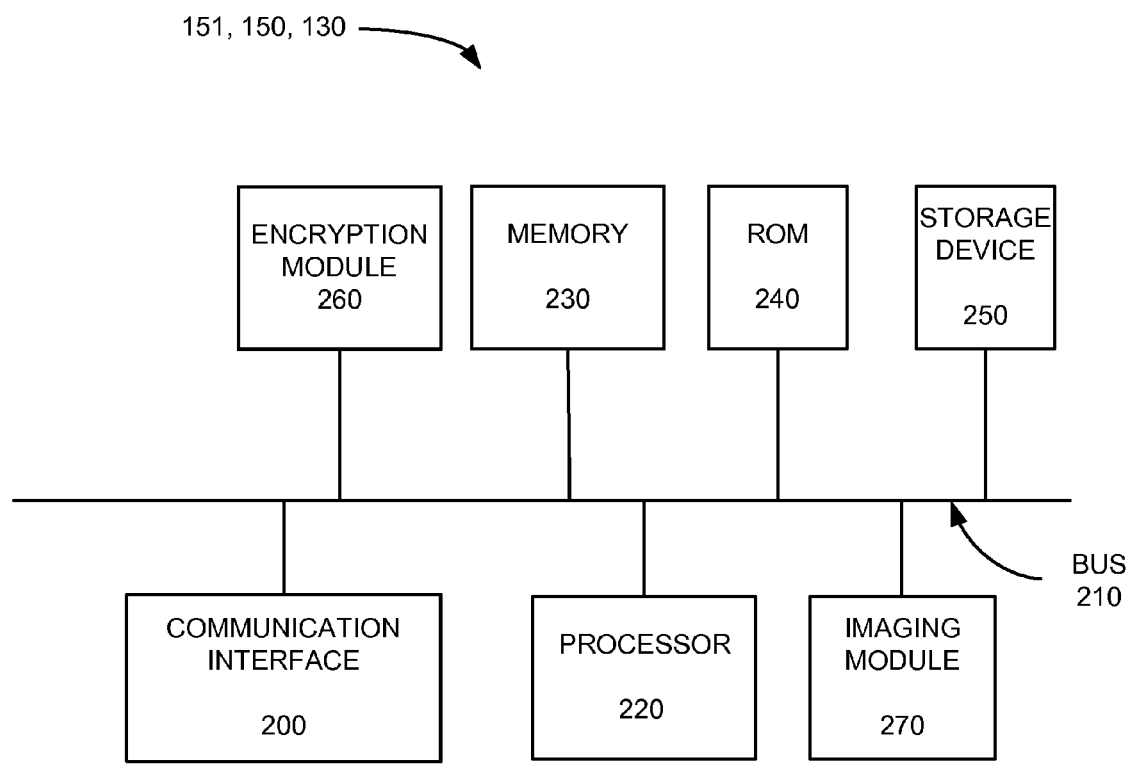
FIG. 2 is a diagram of the exemplary network devices shown in FIG. 1.

FIG. 2 is a diagram of an exemplary configuration of components within network devices, such as master server 151, slave servers 150 and computers 130. Network devices 151, 150 and 130 may include communication interface 200, bus 210, processor 220, memory 230, read only memory (ROM) 240, storage device 250, encryption module 260 and imaging module 270. Bus 210 permits communication among the components of network devices 151, 150 and 130. Network devices 151, 150 and 130 may also include one or more power supplies (not shown). One skilled in the art would recognize that network devices 151, 150 and 130 may be configured in a number of other ways and may include other or different elements.

Communication interface 200 may include communication mechanisms that enable network devices 151, 150 and 130 to communicate with other devices and/or systems. For example, communication interface 200 may include a modem or an Ethernet interface to a WAN or LAN. In addition, communication interface 200 may include other mechanisms for communicating via a network, such as a wireless network. Communication interface 200 may also include transmitters/receivers for communicating data to/from other network devices 151, 150, and 130, for example.

Processor 220 may include any type of processor or microprocessor that interprets and executes instructions. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions. Storage device 250 may also include a flash memory (e.g., an electrically erasable programmable read only memory (EEPROM)) device for storing information and instructions.

Encryption module 260 may include one or more mechanisms that may encrypt/decrypt digital data. For example, encryption module 260 may include software programs that may modify data to produce encrypted data. Encryption module 260 may also transmit/receive information relating to encryption keys necessary to decrypt data, for example.

Imaging module 270 may include memories to store imaging data that may include operating systems and applications used by a computer 130. Imaging module 270 may also include logic and/or programs used to transmit/receive information and image data to/from other network devices 151, 150 and 130, for example. A specific imaging module 270 that may be included in each of network devices 151, 150 and 130 is described below with reference to FIGS. 3-5.

According to an exemplary implementation, master server 151, slave servers 150 and computers 130 may perform various processes in response to processor 220 executing sequences of instructions contained in memory 230 and/or imaging module 270. Such instructions may be read into memory 230 and/or imaging module 270 from another computer-readable medium, such as storage device 250, or from a separate device via communication interface 200. It should be understood that a computer-readable medium may include one or more memory devices or carrier waves. Execution of the sequences of instructions contained in memory 230 and/or imaging module 270 causes processor 220 to perform the acts that will be described hereafter. In alternative embodiments, hard-wired circuitry may be used in place of or in combination with software instructions to implement aspects of the embodiments. Thus, the systems and methods described are not limited to any specific combination of hardware circuitry and software.

Figure 3:
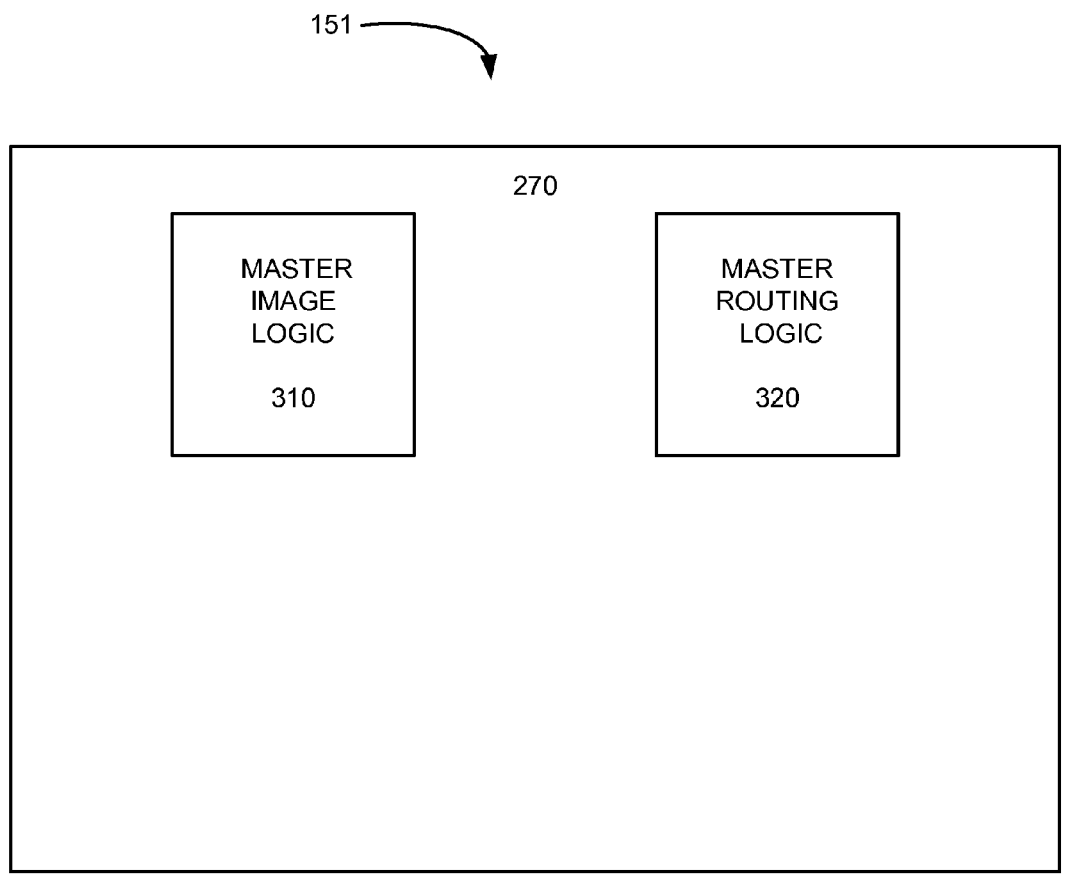
FIG. 3 is a diagram of an exemplary imaging module within a master server as shown in FIG. 1.

FIG. 3 is a diagram of exemplary components of imaging module 270 within master server 151. As shown in FIG. 3, imaging module 270 may include master image logic 310 and master routing logic 320.

Master image logic 310 may include logic and memories for storing image data and associated information. For example, master image logic 310 may include a RAM, ROM, and/or another type of memory to store image data associated with an identified network. For example, specific image data and applications may be stored and associated with network 120-1, while different image data and applications may be stored and associated with network 120-2.

Master routing logic 320 may include logic for routing and/or communicating information and image data over one or more networks. For example, master routing logic 320 may contain information used to communicate over networks 140, 120-5 and 120-6 to slave servers 150-1 and 150-2. Master routing logic 320 may also initiate a daily image data replication process that automatically sends updated image data to all slave servers 150. For example, master routing logic 320 may send any updated image data to slave servers 150 at 4:00 AM each day.

Figure 4:
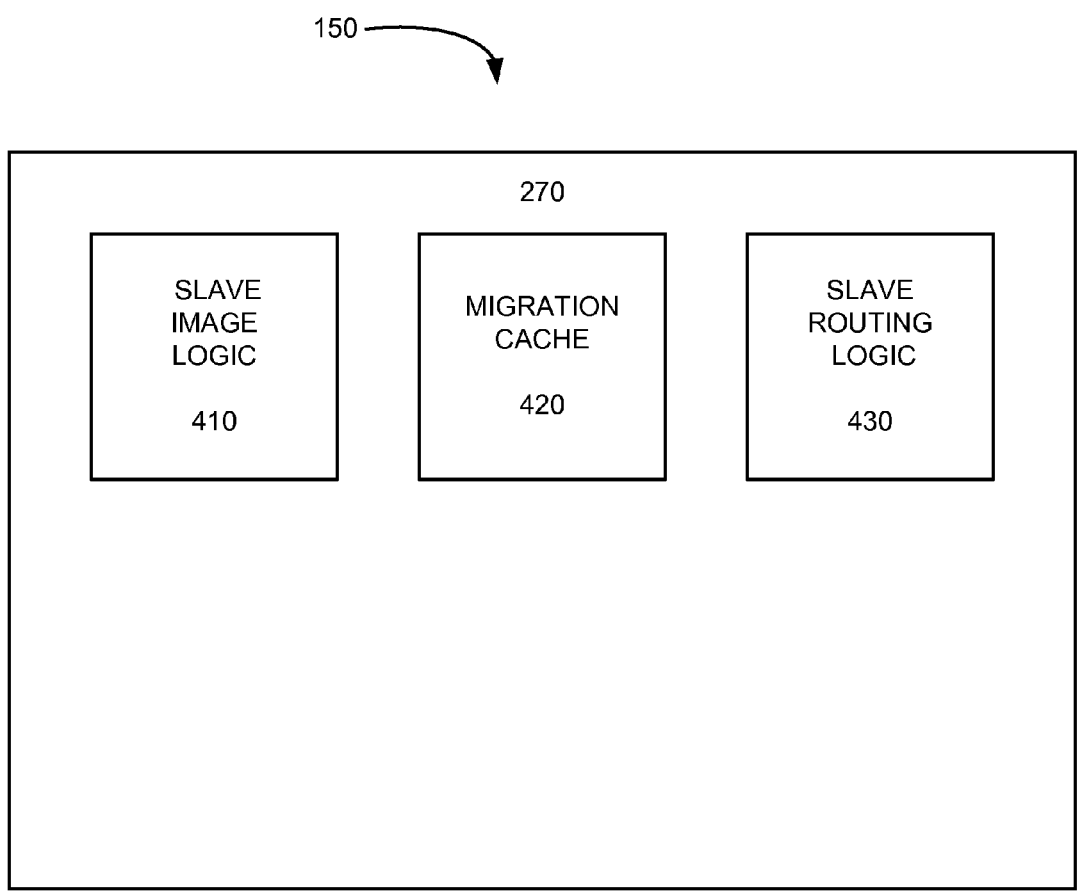
FIG. 4 is a diagram of an exemplary imaging module within a slave server as shown in FIG. 1.

FIG. 4 is a diagram of exemplary components of imaging module 270 within slave server 150. As shown in FIG. 4, imaging module 270 may include slave image logic 410, migration cache 420 and slave routing logic 430.

Slave image logic 410 may include logic and memories for storing image data and associated information received from master server 151. For example, slave image logic 410 may include a RAM, ROM, and/or another type of memory to store image data associated with an identified network. For example, specific image data and applications may be stored and associated with network 120-1, while different image data and applications may be stored and associated with network 120-2.

Migration cache 420 may include memories for storing user settings and/or information received from computers 130. For example, migration cache 420 contained in slave server 150-2 may store user settings and/or information received from computers (not shown) connected to networks 120-3 and 120-4 (as described in FIG. 8 below).

Slave routing logic 430 may include logic for routing and/or communicating information over one or more networks. For example, slave routing logic 430 contained in slave server 150-1 may contain information used to communicate over network 140 to master server 151 and may contain information used to identify and communicate with computers 130 connected to networks 120-1 and 120-2.

Figure 5:
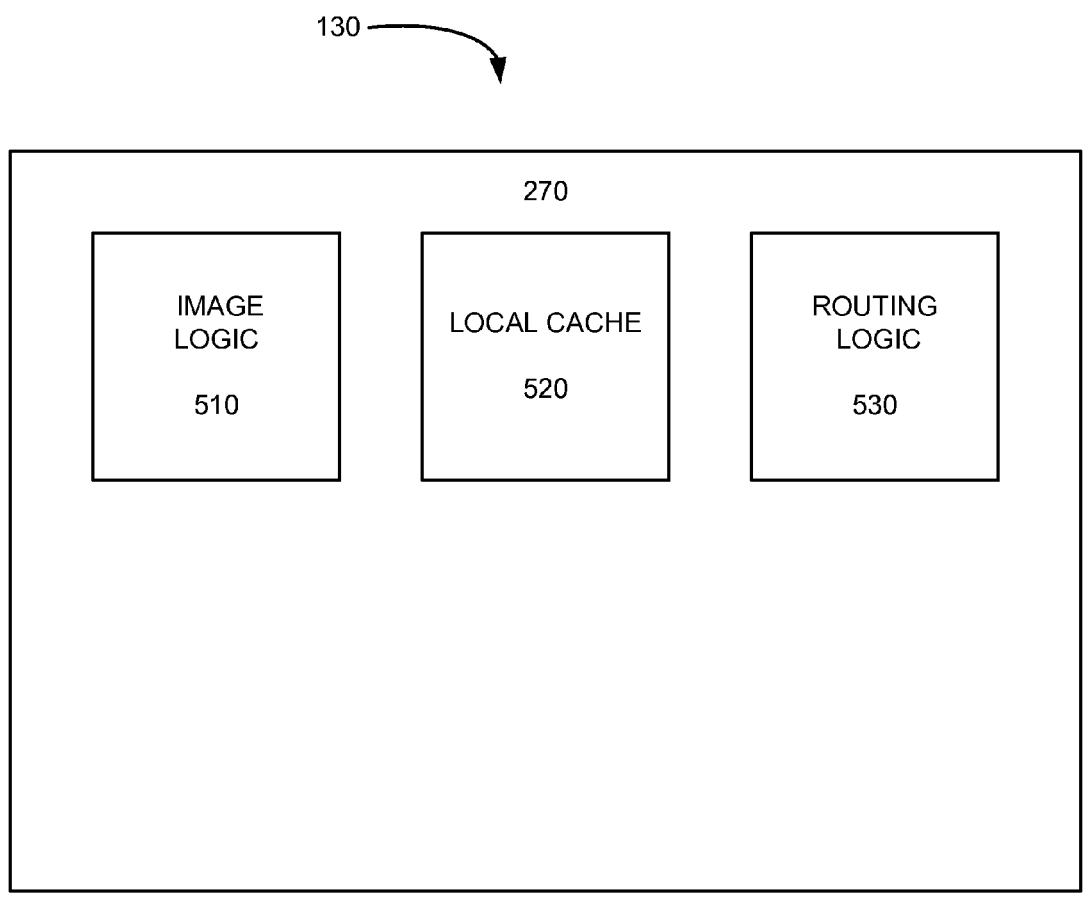
FIG. 5 is a diagram of an exemplary imaging module within a computer as shown in FIG. 1.

FIG. 5 is a diagram of exemplary components of imaging module 270 within computer 130. As shown in FIG. 5, imaging module 270 may include image logic 510, local cache 520 and routing logic 530. As will be described below, imaging module 270 may be configured in computer 130 using the method described below.

Image logic 510 may include logic and memories for storing image data and associated information received from slave server 150 and/or an image CD. For example, image logic 510 may include a RAM, ROM, and/or another type of memory to cache/store image data, such as an OS and software applications. Image logic 510 may also include programs that may instigate and control subsequent image data processes (as described below).

Local cache 520 may include memories used to store software application user settings. For example, software applications such as Microsoft Outlook and Explorer may include user settings specific to a computer 130 and/or a network 120. Operating Systems such as Windows XP and/or Windows Vista may also contain user settings that may be stored in local cache 520.

Routing logic 530 may include logic for routing and/or communicating information over one or more networks. For example, routing logic 530 contained in computer 130-1 may contain information used to communicate over network 120-1 to computer 130-2 and may contain information used to identify and communicate with other computers 130 connected to network 120-1. Routing logic 530 contained in computer 130-1 may also contain information used to identify and communicate over network 120-1 to slave server 150-1.

Figure 6:
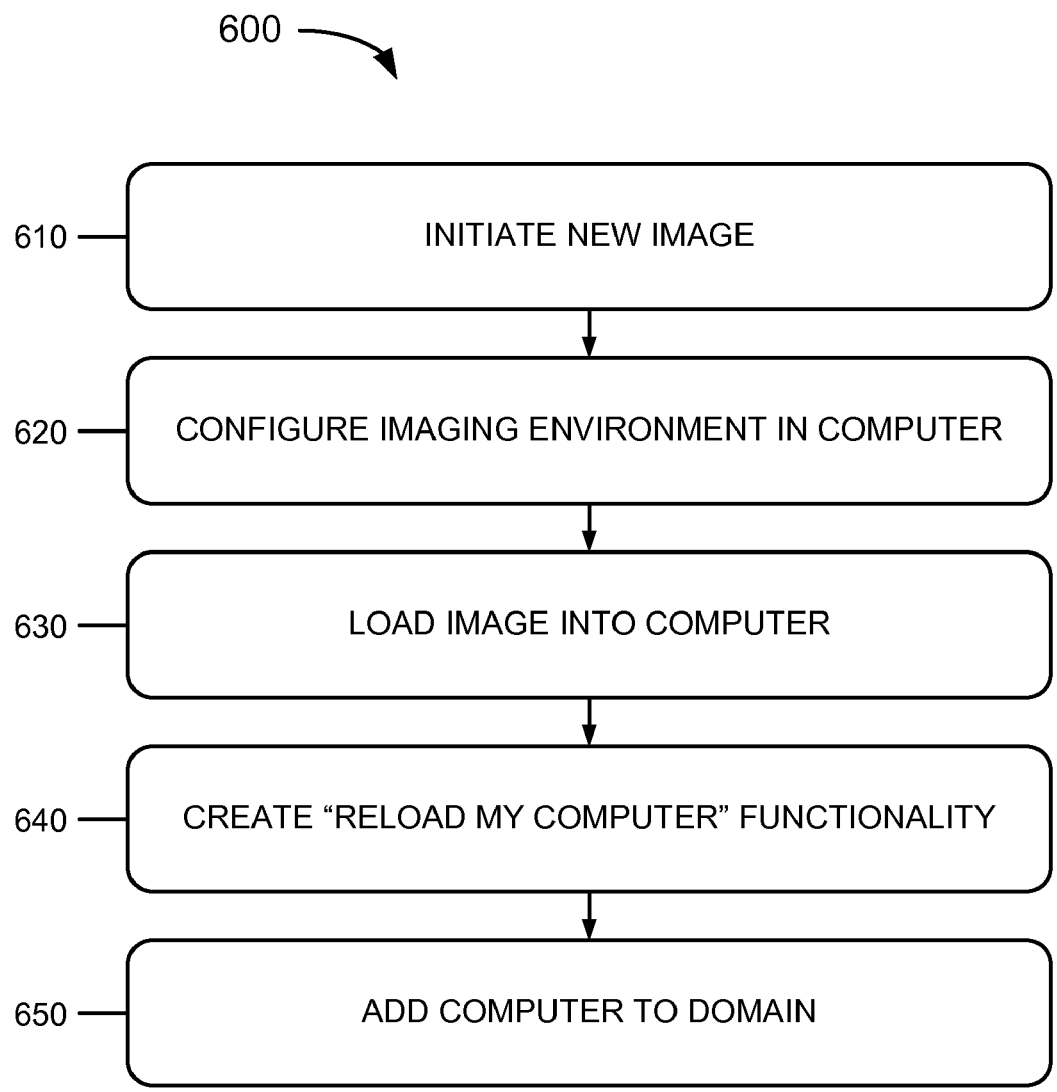
FIG. 6 is a flow diagram illustrating an exemplary initial imaging process.

FIG. 6 illustrates an exemplary initial data imaging process 600. Processing may begin by initiating or obtaining a new image (block 610). For example, a new computer, such as computer 130-2, that may be added or connected to network 120-1 may require image data including software applications and/or an operating system. New image data may be obtained via slave server 150-1, or may be obtained via an image CD or DVD that may be loaded into computer 130-2 (block 610). Once new image data is obtained, an imaging environment may be configured in computer 130-2 (block 620). As shown in FIG. 5 for example, new image data (obtained via slave server 150-1 or an image CD or DVD) may create and/or configure an imaging module 270, which includes image logic 510, local cache 520 and routing logic 530, within computer 130-2. In other examples, an image CD may be used to connect computer 130-2 to slave server 150-1 (block 610) to receive image data that may create an imaging module 270 (block 620).

After an imaging environment (module) has been configured, a new image may be loaded into computer 130-2 (block 630). For example, image data may include an Operating System and business applications used by others in network 120-2. Further, an index file containing information identifying all updated versions of applications and/or programs stored in computer 130-2 may be loaded and stored in image logic 510 (block 630). Image data loaded into image logic 510 may also include programs for initiating and controlling subsequent imaging processes (as described below in FIGS. 7-9). Data and information identifying other computers 130 in network 120-1 and slave servers 150 may be loaded and stored in routing logic 530 (block 630). In further examples, once data and information identifying other computers 130 in network 120-1 have been loaded and stored in routing logic 530, routing logic 530 may query these identified computers 130 for identified and updated versions of applications, and may store these received applications in image logic 510 (block 630).

After loading the new imaging data in computer 130-2 a process for reloading or updating the imaging data may be performed. For example, a "Reload My Computer" functionality may be provided (block 640). For example, an icon displayed on a desktop, or a hidden shortcut may be provided in computer 130-2, in order to allow a user to quickly load updated images as necessary (as will be described in more detail below with respect to FIGS. 7 and 9). Finally, the newly imaged computer may be added to the network domain (block 650). For example, computer 130-2 may be assigned an IP address or email address relating or identifying computer 130-2 as connected to network 120-1. For example, an email address consisting of the user's name followed by "@company.com" may add computer 130-2 to a network domain.

Once blocks 610-650 have been performed, when computer 130-2 is started or booted-up, the imaging data, programs and logic in imaging module 270 may provide a user's desktop image without needing a network connection to obtain such data. Process 600 may be used, for example, to keep all employee workstations (such as computers 130) standardized and up to date throughout a large corporation. Additionally, the imaging data, programs and logic in imaging module 270 within computers 130 may be used to instigate and control subsequent reloading and/or updating image processes as described in FIGS. 7-9.

Figure 7:
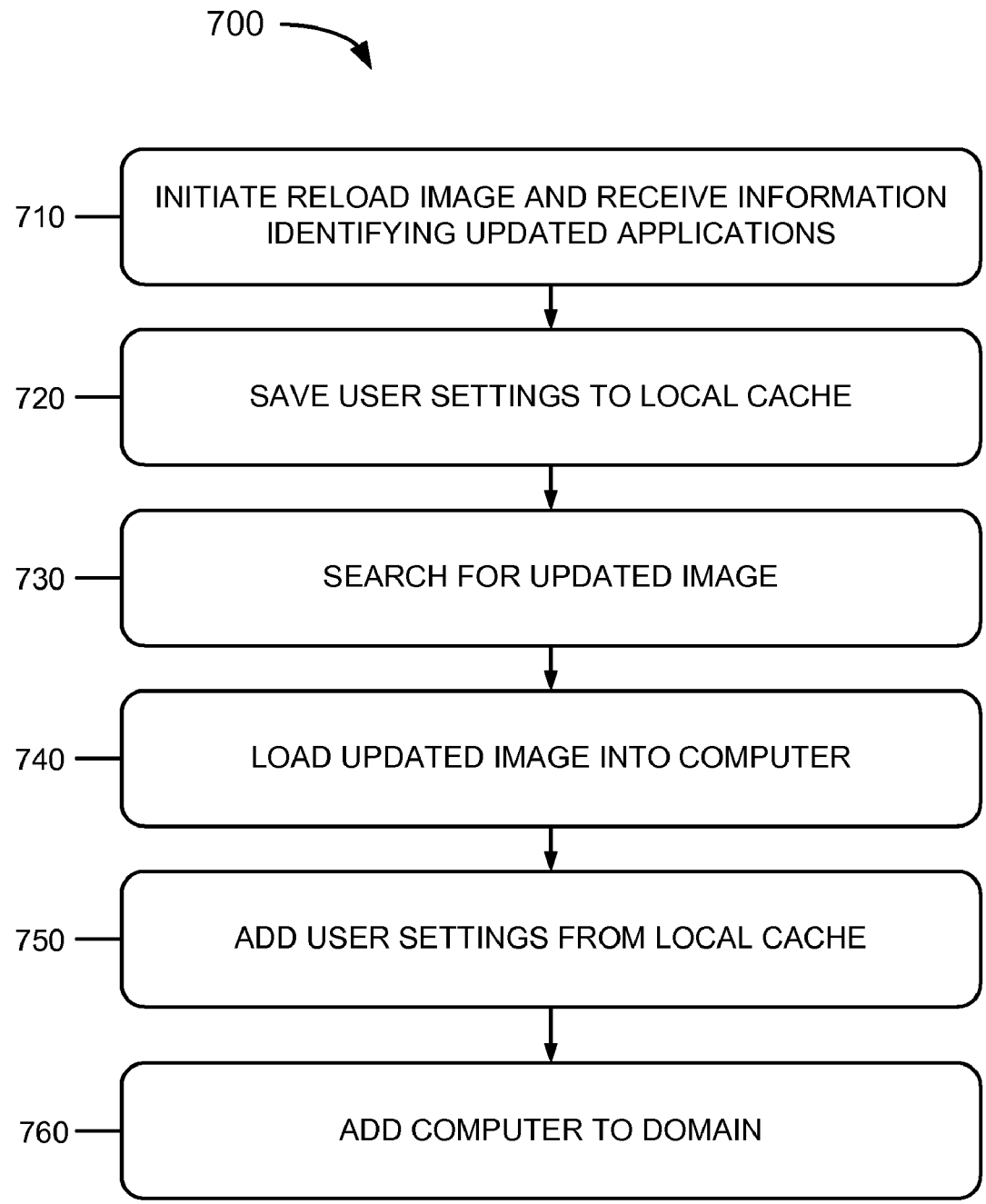
FIG. 7 is a flow diagram illustrating an exemplary reloading imaging process.

FIG. 7 illustrates another exemplary imaging process 700. Processing may begin by initiating a "Reload Image" process (block 710). For example, if all users connected to network 120-1 are required to use a new and updated business software application, a user of computer 130-2 may click on a "Reload My Computer" icon or shortcut that may have been previously added to computer 130-2 (in block 640). In other examples, a "Reload Image" process may be automatically initiated at predetermined times (such as 4:00 AM each day) to ensure that computer 130-2 has the latest software. In response to initiation of a "Reload Image" process, image logic 510 may receive information identifying updated application(s), such as a new business software application from slave server 150-1 (block 710). In another example, the information received from slave server 150-1 may be an index file identifying all updated/current software applications and/or operating system used by computers 130 within a network 120. Slave server 150-1 may identify updated versions of a software application based on version number information, release date, etc. In still further examples, a "Reload Image" process may be initiated by an image CD, where the image CD connects computer 130-2 to slave server 150-1 for further processing (block 710). Image logic 510 may then save user application settings from the outdated business application into local cache 520 (block 720). Routing logic 530 may then query and/or search for the identified updated image (block 730). For example, routing logic 530 may transmit a query to other computers 130 connected to network 120-1 to determine if any other computer 130 contains the identified updated business software application (block 730). If, for example, computer 130-1 contains the identified updated business software application, this image may be transmitted to and loaded into computer 130-2 (block 740). In another example, image logic 510 may compare a received index file identifying all update/current applications to the applications currently stored in image logic 510 to determine which applications need to be updated. Based on this comparison for example, if image logic 510 determines that three applications need updating, a number of other computers 130 connected to network 120-1 may be queried to determine if they contain one or all of the identified three applications (block 730).

Continuing with this example, three different computers 130 in network 120-1 may each provide one of the three applications to computer 130-2, or a single computer 130 in network 120-1 may provide all three applications to computer 130-2 (block 740). In another example, if the identified updated business software application is not stored in any computer 130 in network 120-1, routing logic may then transmit a query to slave server 150-1 requesting the identified updated business software application (block 730). Slave server 150-1 may then transmit this updated software application to be loaded and stored in computer 130-2 (block 740). For example, the updated business software application (and information identifying this application) may be stored in image logic 510. In this manner, computer 130-2 may minimize network resources and communications (bandwidth) to slave server 150-1 by receiving image data from other computers 130 within network 120-1.

After the new image data is stored, the user settings stored in local cache 520 may be applied in the newly updated application (block 750). As described in the examples above, user settings from one or a number of applications may be stored in local cache 520 and applied to the received updated application(s) (block 750). After loading the new image (application) and applying the stored user settings, the computer may be added to the network domain (block 760). For example, computer 130-2 may be assigned an IP address or email address relating or identifying computer 130-2 as connected to network 120-1.

In further examples, networks 120 and/or computers 130 may be in secure or encrypted environments, where encryption module 260 may be used to encrypt/decrypt data before/after transmission or storage between computers 130, slave servers 150 and master server 151. For example, image data may be encrypted by encryption module 260 before being stored in image logic 510 in computer 130-2. Further, computer 130-1 may transmit an encrypted updated application to computer 130-2 (in block 740) where computer 130-2 may use encryption module 260 to decrypt this received application, for example. In other examples, encryption module 260 may be used to protect and/or allow access to stored data (that is not encrypted) within imaging module 270 within computer 130. For example, encryption module 260 may require a password or identification to allow a computer 130 or slave server 150 to access stored data contained in image logic 510, local cache 520 and/or routing logic 530.

Figure 8:
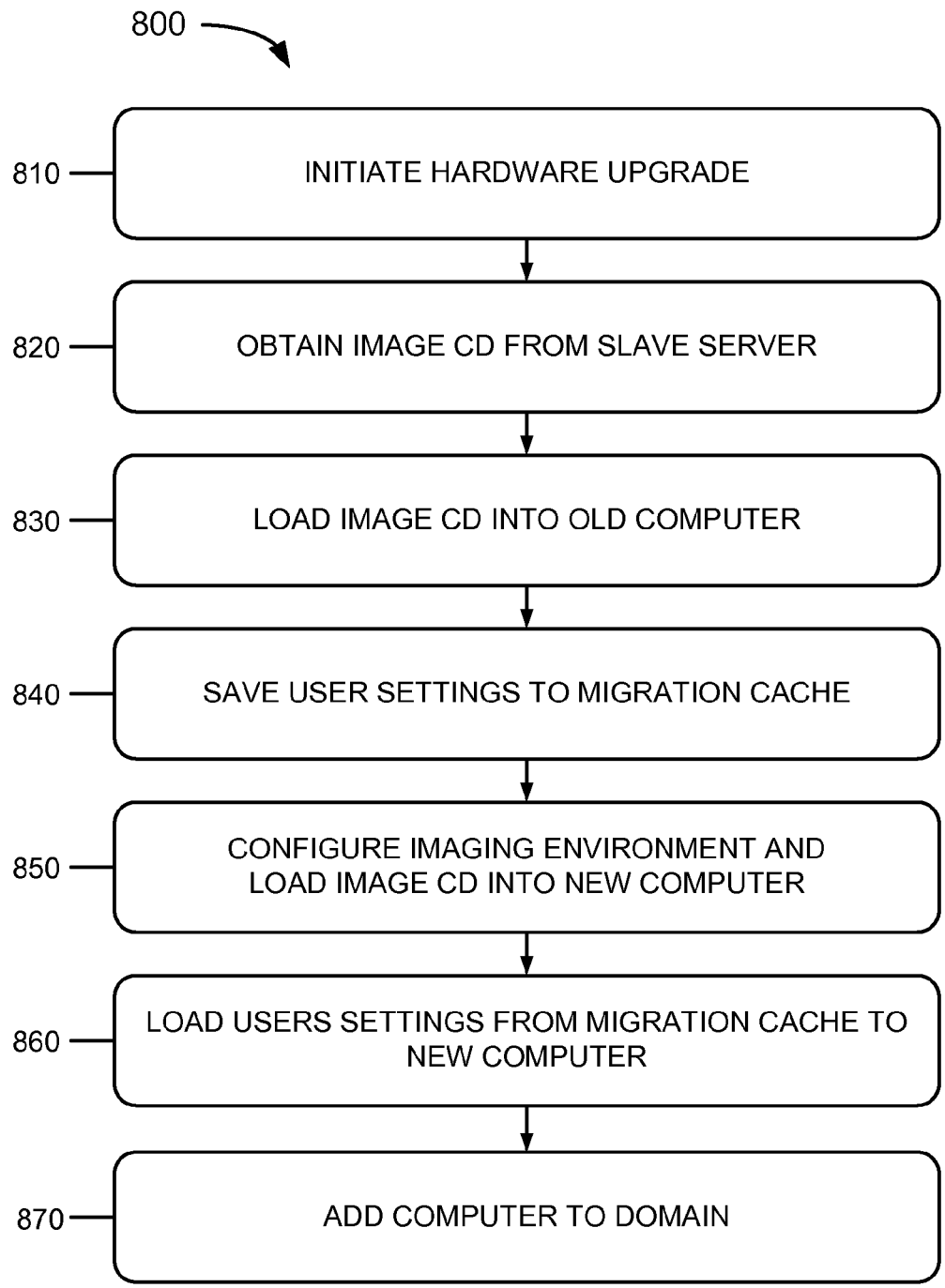
FIG. 8 is a flow diagram illustrating an exemplary hardware upgrade imaging process.

FIG. 8 illustrates another exemplary imaging process 800. Processing may begin by initiating a "Hardware Upgrade" process (block 810). For example, a user connected to network 120-1 may transmit a signal to slave server 150-1 and/or a technician to replace their current (old) computer 130 with an upgraded new computer 130. In response to initiation of a "Hardware Upgrade" process, a technician may obtain an image CD from slave server 150-1 (block 820). The image data may then be loaded from the CD into the user's old computer (block 830).

The loaded image data from the image CD may be stored in image logic 510 within computer 130-1, for example. Image logic 510 may then transmit user application settings from local cache 520 (within a user's old computer) to be saved in migration cache 420 of slave server 150-1 (block 840).

After the user's settings have been saved within slave server 150-1, upon loading the image CD, the user's new computer may be configured to form an imaging environment and the new image from the CD may be stored (block 850). For example, the same image CD used in the user's old computer (in block 820) may be loaded into the user's new computer to create an imaging module 270. Once imaging module 270 is formed, the new image data from the CD may be received and stored in image logic 510, local cache 520 and routing logic 530. Image logic 510 within new computer 130 may transmit a signal to slave server 150-1 indicating that a hardware upgrade is continuing. In response to this signal, the user's settings may be transmitted from slave server 150-1 to the user's new computer 130 (block 860). Once the user settings are received from the slave server 150-1 they may be applied in the new computer 130. Finally, after loading the new image and applying the user settings, the computer may be added to the network domain (block 870). For example, computer 130-2 may be assigned an IP address or email address relating or identifying computer 130-2 as connected to network 120-1, for example. Additionally, slave server 150-1 may perform and/or process a number of "Hardware Upgrade" processes simultaneously for a number of computers 130. If, for example, 20 employees connected to network 120-1 each get new computers 130, process 800 may be performed simultaneously for each new computer 130.

Figure 9:
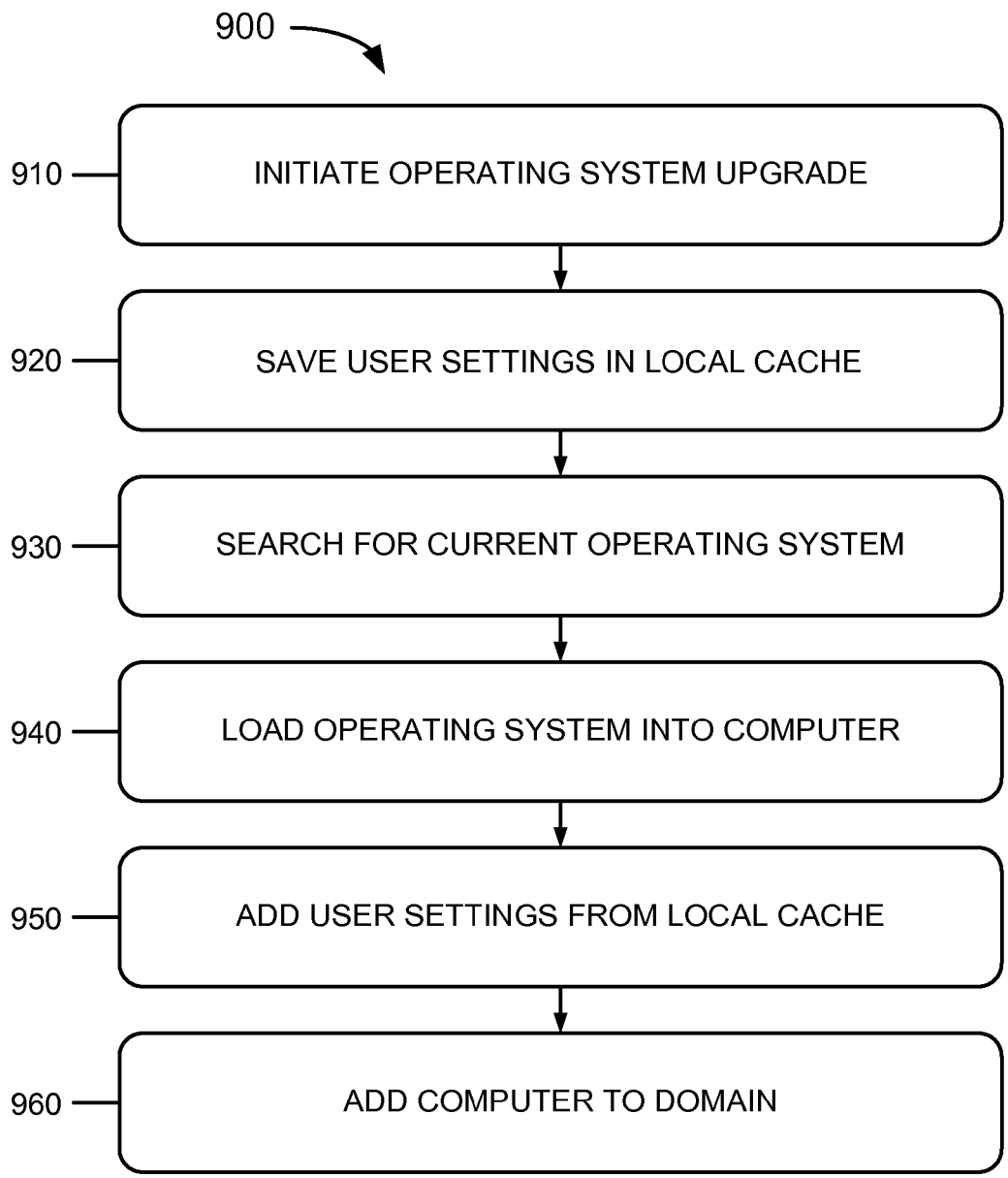
FIG. 9 is a flow diagram illustrating an exemplary operating system upgrade imaging process.

FIG. 9 illustrates another exemplary imaging process 900. Processing may begin by initiating an "Operating System Upgrade" process (block 910). For example, if a business operating on network 120-2 has upgraded their operating system from Windows 2000 to Vista, a user of computer 130-2 may click on a "Reload My Computer" icon or shortcut that may have been previously added to computer 130-2 (in block 640) and select an "Operating System Upgrade" option. In another example, an "Operating System Upgrade" process may be initiated by an image CD, where the image CD connects computer 130-2 to slave server 150-1 for further processing (block 910). In response to initiation of an "Operating System Upgrade" process, image logic 510 may receive information identifying the new OS from slave server 150-1. Image logic 510 may then save user application settings from the old OS into local cache 520 (block 920). Routing logic 530 may then query and/or search for the identified new OS (block 930). For example, routing logic 530 may transmit a query to other computers 130 connected to network 120-1 to determine if any other computer 130 contains the identified upgraded OS (block 930). If, for example, computer 130-1 contains the identified upgraded OS, this OS may be transmitted to and loaded into computer 130-2 (block 940). In another example, if the identified upgraded OS is not stored in any computer 130 in network 120-1, routing logic may then transmit a query to slave server 150-1 requesting the identified upgraded OS (block 930). Slave server 150-1 may then transmit this upgraded OS to be loaded and stored in computer 130-2 (block 940).

After the new OS is stored, the user settings stored in local cache 520 may be applied in the new OS (block 950). After loading the new OS and applying the user settings, the computer may be added to the network domain (block 960). For example, computer 130-2 may be assigned an IP address or email address relating or identifying computer 130-2 as connected to network 120-1, for example.

Conclusion

Implementations consistent with the systems and methods described herein may configure an imaging module within a computer to provide methods of obtaining imaging data in a peer-to-peer manner from other computers in a network. By querying and receiving image data from other computers in a network first, the methods of obtaining imaging data for a computer minimize network traffic to slave servers and a master server.

The foregoing description of the embodiments provides illustration and description, but is not intended to be restrictive or to limit implementations to the precise form disclosed. Modifications, additions and variations are possible in light of the above teachings without departing from the broader scope of the embodiments as set forth in the claims that follow.

For example, the embodiments have been described in the context of computers and servers transmitting over data communications networks. The embodiments described herein may be implemented in other devices or systems and/or networks.

Further, while series of acts have been described with respect to FIGS. 6-9, the order of the acts may be varied in other implementations. Moreover, non-dependent acts may be performed in parallel.

It will also be apparent that aspects of the implementations, as described above, may be implemented in cellular communication devices/systems, methods, and/or computer program products. Accordingly, the implementations may be embodied in hardware and/or in software (including firmware, resident software, micro-code, etc.). Furthermore, the implementations may take the form of a computer program product on a computer-usable or computer-readable storage medium having computer-usable or computer-readable program code embodied in the medium for use by or in connection with an instruction execution system. The actual software code or specialized control hardware used to implement aspects of the embodiments is not limiting of the systems and methods described. Thus, the operation and behavior of the aspects were described without reference to the specific software code—it being understood that one would be able to design software and control hardware to implement the aspects based on the description herein.

Further, certain portions of the embodiments may be implemented as "logic" that performs one or more functions. This logic may include hardware, such as a processor, a microprocessor, an application specific integrated circuit or a field programmable gate array, software, or a combination of hardware and software.

No element, act, or instruction used in the description of the present application should be construed as critical or essential to the systems and methods described unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the systems and methods described herein are defined by the claims and their equivalents.

What is claimed is:

1. A method comprising:
saving, by a device, user settings associated with an application, in a memory;
receiving, by the device and from a first network device, information identifying an update of the application, the device being different than the first network device;
querying, by the device, a plurality of second network devices for the update of the application based on receiving the information identifying the update of the application, the plurality of second network devices being different than the first network device and the device, the device and the plurality of second network devices being of a first type, and
the first network device being of a second type different than the first type;
receiving, by the device, the update of the application from one of the plurality of second network devices when the one of the plurality of second network devices includes the update of the application;
updating, by the device, the application using the update of the application, received from the one of the plurality of second network devices when the one of the plurality of second network devices includes the update of the application, to obtain an updated application; and applying, by the device, the saved user settings, from the memory, to the updated application.

2. The method of claim 1, the method further comprising:
determining, based on querying the plurality of second network devices, whether the plurality of second network devices includes the update of the application;
querying the first network device for the update of the application when the plurality of second network devices does not include the update of the application.

3. The method of claim 2, further comprising:
storing routing information identifying the first network device and the plurality of second network devices,
where the first network device and the plurality of second network devices are queried based on the routing information.

4. The method of claim 1, where the plurality of second network devices include computers in a network, and
where the first network device includes a server in the network.

5. The method of claim 1, where the update of the application includes at least one of an update of a software application or an update of an operating system.

6. A network device, comprising:
a memory to store user settings of an application; and logic, implemented at least partially in hardware, to:
receive information, from a second network device, identifying update of the application,
the second network device being different than the network device, the
second network device including a server;
cause the memory to store the user settings of the application after receiving the information identifying the update of the application;
query a third network device for the update of the application based on receiving the information identifying the update of the application,
the third network device being different than the network device, and the third network device including a computer;
receive the update of the application from the third network device when the third network device includes the update of the application;
update the application, using the update of the application received from the third network device when the third network device includes the update of the application, to obtain an updated application; and
apply the stored user settings of the application to the updated application.

7. The network device of claim 6, where the memory further stores information identifying the second network device and information identifying the third network device,
where the logic is to query the third network device based on the information identifying the third network device, and
where the logic is further to query the second network device, based on the information identifying the second network device, for the update of the application when the third network device does not include the update of the application.

8. The network device of claim 6, where the logic is further to: automatically query the second network device for the update of the application when the third network device does not include the update of the application.

9. The network device of claim 8, where the update of the application includes at least one of an update of a software application or an update of an operating system.

10. A non-transitory computer-readable medium comprising:
- one or more instructions which, when executed by at least one processor of a network device, cause the at least one processor to store user settings in the network device, the user settings relating to one or more applications;
- one or more instructions which, when executed by the at least one processor, cause the at least one processor to receive information identifying one or more updated versions of the one or more applications;
- one or more instructions which, when executed by the at least one processor, cause the at least one processor to query a plurality of other network devices for the one or more updated versions of the one or more applications based on receiving the information identifying the one or more updated versions of the one or more applications, the plurality of other network devices and the network device including computers;
- one or more instructions which, when executed by the at least one processor, cause the at least one processor to receive the one or more updated versions of the one or more applications from at least one of the plurality of other network devices, and
- one or more instructions which, when executed by the at least one processor, cause the at least one processor to apply the user settings to the one or more updated versions of the one or more applications.

11. The non-transitory computer-readable medium of claim 10, where the one or more instructions to receive the one or more updated versions of the one or more applications comprise:
- one or more instructions to receive an updated version of a first application, of the one or more updated versions of the one or more applications, from a first network device of the plurality of other network devices; and
- one or more instructions to receive an updated version of a second application, of the one or more updated versions of the one or more applications, from a second network device, of the plurality of other network devices, that is different than the first network device.

12. The non-transitory computer-readable medium of claim 10, further comprising:
- one or more instructions to periodically check for the one or more updated versions of the one or more applications; and
- one or more instructions to receive the information identifying the one or more updated versions of the one or more applications based on periodically checking for the one or more updated versions of the one or more applications.

13. The non-transitory computer-readable medium of claim 10, further comprising:
- one or more instructions to query, after receiving the one or more updated versions of the one or more applications, the plurality of other network devices for one or more additional updated versions of the one or more applications;
- one or more instructions to receive the one or more additional updated versions of the one or more applications; and
- one or more instructions to apply the user settings to the one or more additional updated versions of the one or more applications.

14. The non-transitory computer-readable medium of claim 10, where the received information identifying the one or more updated versions of the one or more applications is received from a server,
the non-transitory computer-readable medium further comprising:
- one or more instructions to store, in the network device, the received information identifying the one or more updated versions of the one or more applications.

15. A method comprising:
- receiving, by a first network device and from a second network device, first information relating to an upgrade from the second network device to a third network device,
- the first network device, the second network device, and the third network device differing one from another,
- the first network device including a server, and the second network device and the third network device including computers;
- receiving, by the first network device, application user settings from the second network device after receiving the first information;
- receiving, by the first network device and from the third network device, second information relating to the upgrade from the second network device to the third network device, the second information including information requesting the application user settings,
- the second information being received after receiving the application user settings; and
- transmitting the application user settings to the third network device based on receiving the information requesting the application user settings,
- the application user settings being applied, by the third network device, to at least one application in the third network device.

16. The method of claim 15, further comprising:
receiving a request, from a user, to upgrade from the second network device to the third network device,
the first information being included in the request, and
the second information being received from the user.

17. The method of claim 16, further comprising:
identifying the user as operating the second network device and the third network device,
the application user settings being transmitted to the third network device based on identifying the user as operating the second network device and the third network device.

18. The method of claim 17, further comprising:
- receiving a request to upgrade from a fourth network device to a fifth network device;
- receiving other application user settings from the fourth network device after receiving the request to upgrade from the fourth network device to the fifth network device; and
- transmitting the other application user settings to the fifth network device based on a request, from the fifth network device, for the other application user settings,
- the other application user settings being transmitted simultaneously with the application user settings.

* * * * *